United States Patent
Tujkovic et al.

(10) Patent No.: US 9,455,824 B1
(45) Date of Patent: Sep. 27, 2016

(54) DISTRIBUTED NETWORK SYNCHRONIZATION METHODS AND ARCHITECTURES

(71) Applicant: Facebook, Inc., Menlo Park, CA (US)

(72) Inventors: Djordje Tujkovic, Mountain View, CA (US); Sanjai Kohli, Manhattan Beach, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/751,744

(22) Filed: Jun. 26, 2015

(51) Int. Cl.
*H04L 7/04* (2006.01)
*H04L 7/033* (2006.01)
*H04B 7/04* (2006.01)
*H04L 27/00* (2006.01)

(52) U.S. Cl.
CPC ........... *H04L 7/0331* (2013.01); *H04B 7/0413* (2013.01); *H04L 2027/0026* (2013.01)

(58) Field of Classification Search
CPC .................... H04L 7/0331; H04L 7/0431
See application file for complete search history.

(56) References Cited

U.S. PATENT DOCUMENTS

| | | | |
|---|---|---|---|
| 6,347,084 B1* | 2/2002 | Hulyalkar | H04B 7/2678 370/347 |
| 2002/0183864 A1* | 12/2002 | Apel | G05B 19/042 700/14 |
| 2003/0109264 A1* | 6/2003 | Syrjarinne | H04W 64/00 455/456.1 |
| 2004/0190378 A1* | 9/2004 | Farmer | H04W 56/0015 368/47 |
| 2006/0013347 A1* | 1/2006 | Brown | H04B 7/2693 375/354 |
| 2011/0103432 A1* | 5/2011 | Tangudu | G01S 19/21 375/150 |
| 2011/0188474 A1* | 8/2011 | Indirabhai | H04W 56/00 370/331 |
| 2012/0207183 A1* | 8/2012 | Bobrek | H04J 3/0641 370/511 |
| 2012/0275317 A1* | 11/2012 | Geva | H04J 3/0667 370/250 |
| 2015/0103818 A1* | 4/2015 | Kuhn | H04W 56/00 370/350 |
| 2015/0312093 A1* | 10/2015 | Woloschek | H04L 49/25 370/254 |

* cited by examiner

*Primary Examiner* — Jaison Joseph

(57) ABSTRACT

Various of the disclosed embodiments synchronize transmission/reception timing between nodes in a wireless network of nodes. Some embodiments share GPS reference signals and local clock values between nodes to identify relative offset corrections. These corrections may then be used to synchronize transmission/reception periods. A PLL at each node may adjust a received GPS signal to coincide with a local operational frequency at the node, while pulse detect logic may be used to record when the GPS signal was received. Some embodiments also address scenarios where GPS signals are not available at one of the nodes. The deficient node may instead identify its local offset by maximizing the cross-correlation of a signal received from a node retaining GPS capability. In some embodiments, the cumulative error along paths in the network may be determined to further compensate for the behavior of nodes lacking GPS capability. GPS capability may, e.g., be deliberately omitted from some nodes to reduce costs.

14 Claims, 14 Drawing Sheets

Path A Error: E1 + E3 + E4 + E7

Path B Error: E1 + E2 + E5 + E6

DISTRIBUTED NETWORK SYNCHRONIZATION METHODS AND ARCHITECTURES

TECHNICAL FIELD

The disclosed embodiments relate to distributed networks implementing Multi-Input-Multi-Output (MIMO) communications schemes.

BACKGROUND

High-speed, high-bandwidth communications are increasingly in demand as populations and population densities increase. Distributed wireless networks comprised of multiple locally-communicating MIMO nodes may be able to meet this demand. Each node may be used to convey network communications between a backbone and end user devices. The distributed nodes may be particularly useful in dense urban areas, or in remote locations lacking substantial infrastructure. The nodes can be installed and managed by local residents, facilitating a versatile solution adaptive to the needs and circumstances of a particular community.

To minimize latency and maximize throughput, the Media Access Control (MAC) protocol in many wireless backhauls is based on either Frequency Division Duplexing (FDD) or Time Division Duplexing (TDD). Wireless nodes may need to be tightly synchronized in timing (sampling rate) and carrier frequency to maximize the spectral efficiency of the MAC. Unfortunately, to minimize costs and make such deployments feasible, the components used in a given node may be susceptible to various errors. In addition, the remote character of some deployments make it uneconomical or unfeasible to service the nodes, resulting in gradual errors in nodes possessing even high quality components. These errors, such as defective clock patterns can result in poor or no viable communications between neighboring nodes. Accordingly, there exists a need for systems and methods to compensate for node errors to facilitate effective clock synchronization.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

Figure 1:
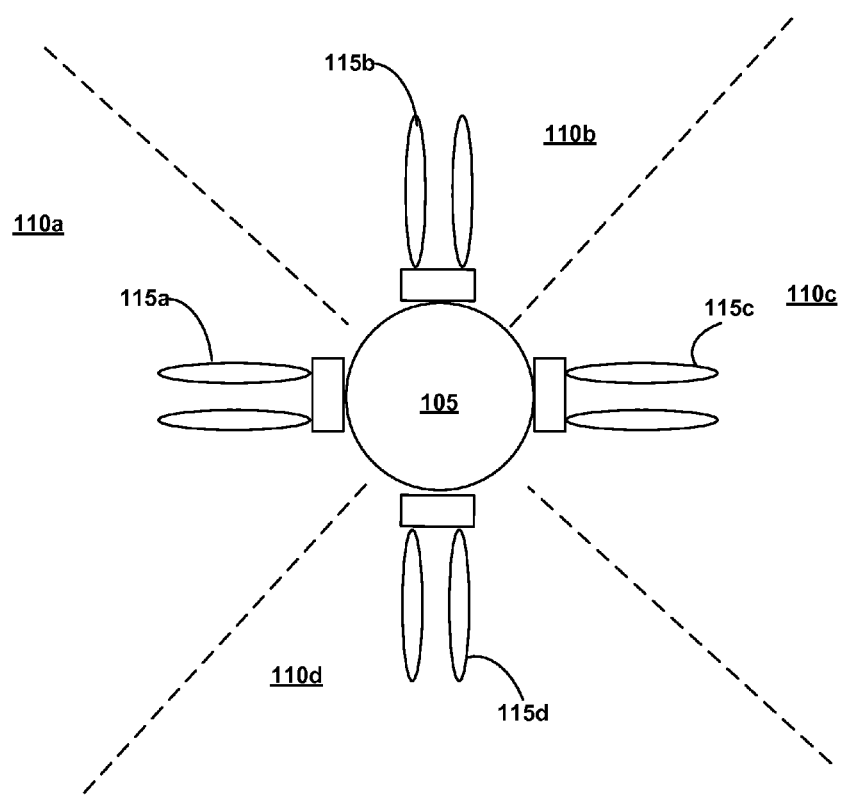
FIG. 1 is a block diagram illustrating some components of a wireless network node as may be implemented in some embodiments.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Various of the disclosed embodiments synchronize transmission/reception timing between nodes in a wireless network of nodes. Some embodiments share GPS reference signals and local clock values between nodes to identify relative offset corrections. Particularly, GPS incorporates the Precision Time Protocol (PTP) which provides a common reference clock signal. One will recognize that other geolocation protocols may be used, providing mutatis mutandis a corresponding reference signal. These corrections may then be used to synchronize transmission/reception periods. A Phase Locked Loop (PLL) at each node may adjust a received GPS signal to coincide with a local operational frequency at the node, while pulse detect logic may be used to record when the GPS signal was received. Some embodiments also address scenarios where GPS signals are not available at one of the nodes. The deficient node may instead identify its local offset by maximizing the cross-correlation of a signal received from a node retaining GPS capability. In some embodiments, the cumulative error along paths in the network may be determined to further compensate for the behavior of nodes lacking GPS capability. GPS capability may, e.g., be deliberately omitted from some nodes to reduce costs.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview

FIG. 1 is a block diagram illustrating components of a wireless network node 105 as may be implemented in some embodiments. In this example, the node 105 has four sets of MIMO antennas 115a-d which may be used to directionally communicate with other nodes in one of four different sectors 110a-d. Though only two antennas are shown in each set in this example, one will recognize that many more antennas may be used, and that more or less than four sets may be used at a given node. Some nodes in a network may have different sets of nodes and different numbers of antennas per set than other nodes in the network. The antennas may be used to steer and/or form a directional beam for transmission/reception with another node. In some embodiments, the node may even be able to steer the beam from one set of antennas into the sector of another antenna set. The node may be fitted with additional hardware, such as a GPS unit and a wireless access point, such as an 802.11 access point.

Figure 2:
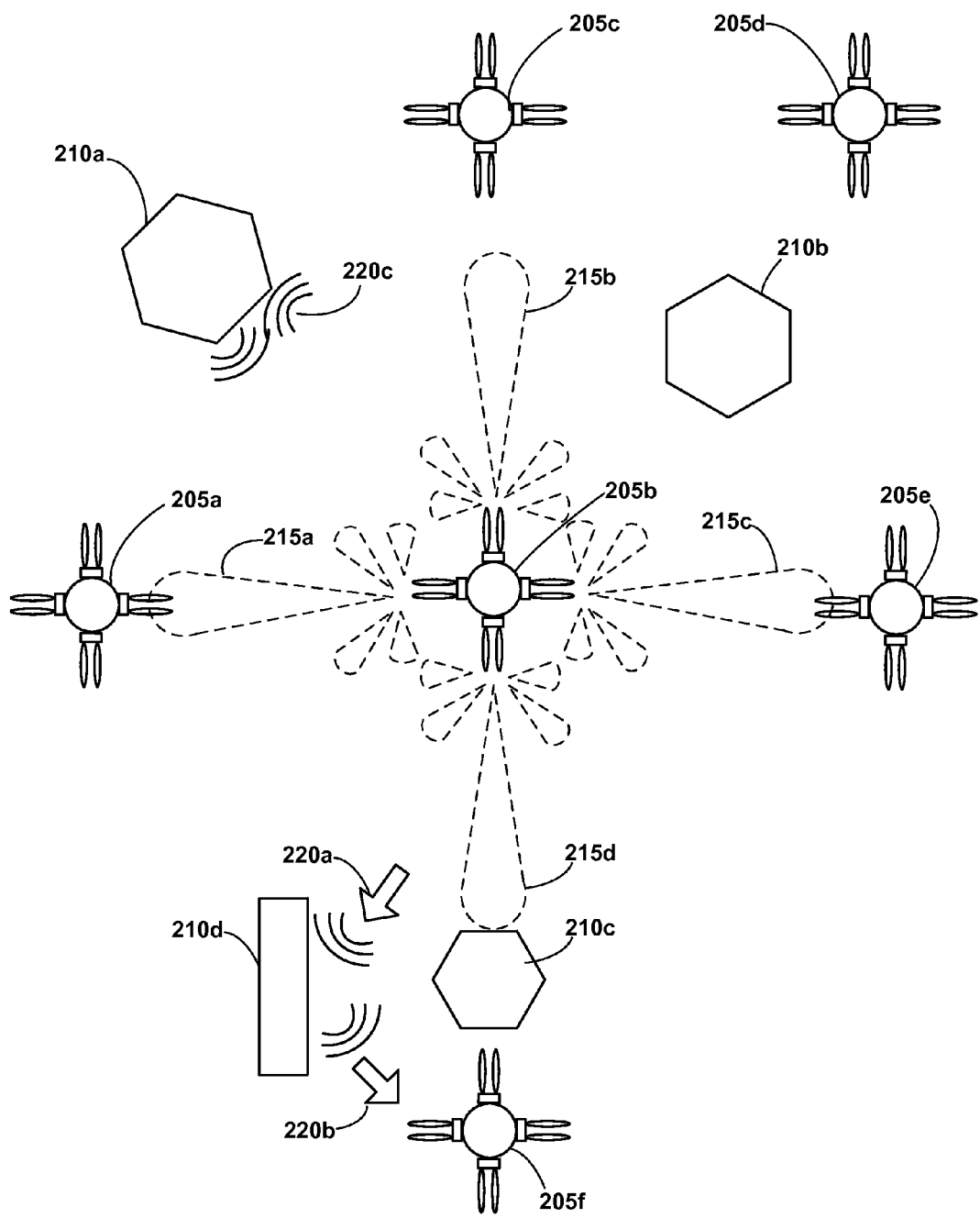
FIG. 2 is a block diagram illustrating an example network topology with several nodes as may be implemented in some embodiments.

FIG. 2 is a block diagram illustrating an example network topology with several nodes as may be implemented in some embodiments. In this portion of a network, six nodes 205a-f may be used to route communications from end users to a backbone. For example, a node 205b may use each of directional beam-formed patterns 215a-d to communicate with peer nodes 205a,c,e,f. Obstacles 210a-d may be transient (e.g., buses, people, animals, weather factors, etc.) or fixed (trees, buildings, geological structures, etc.). Radiation emissions incident on the obstacles 210a-d may be reflected 220c. In some embodiments, reflection may be used to avoid one obstacle 210c by reflecting waves 220a, 220b off another obstacle 210d. Beam steering may be used to take advantage of the environment in this manner.

Timing Synchronization

Figure 3:
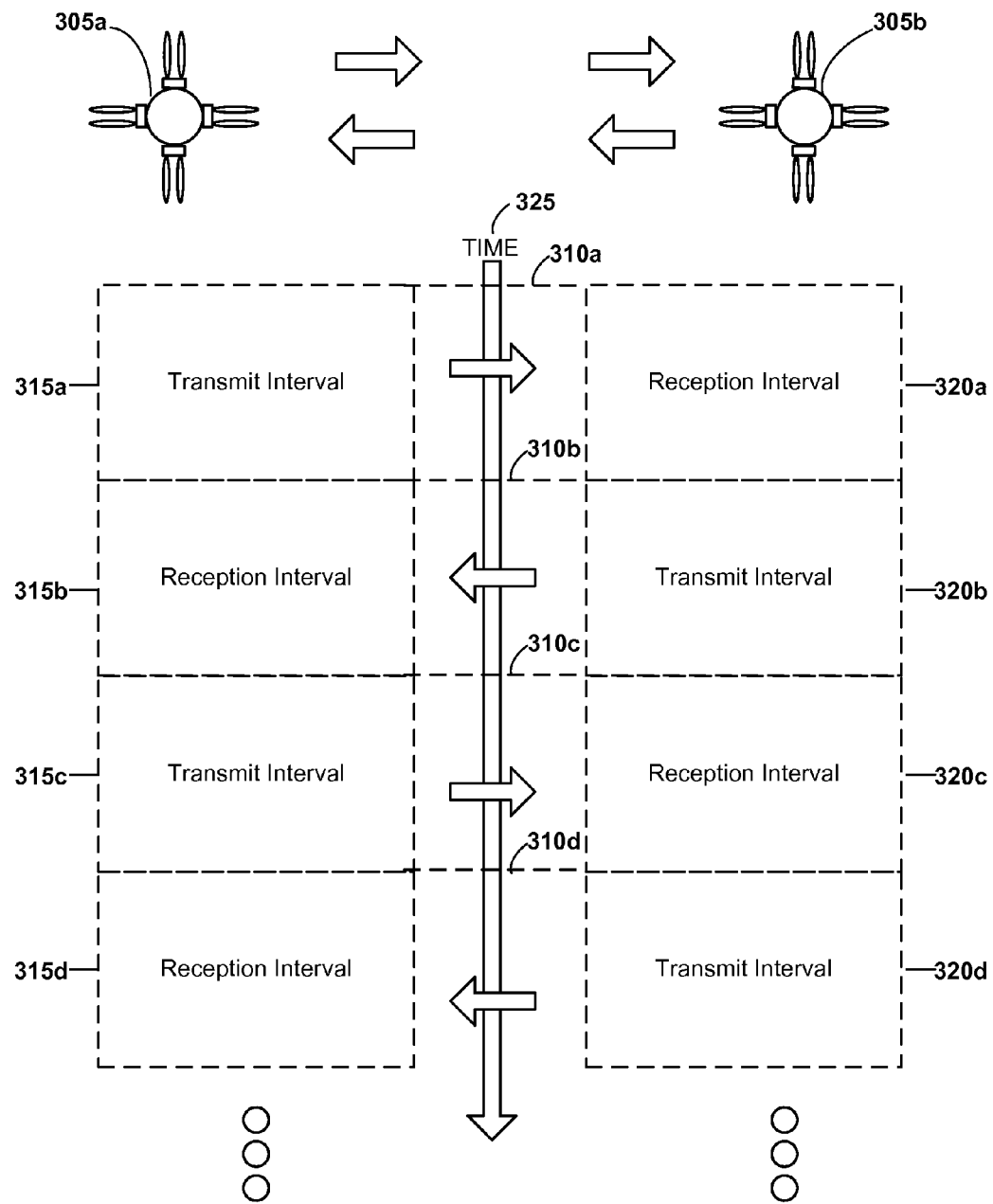
FIG. 3 is a block diagram of an idealized transmission/reception timetable as may occur in some embodiments.

FIG. 3 is a block diagram of an idealized transmission/reception timetable as may occur in some embodiments. As illustrated, each node's clock will ideally be synchronized such that each node's transmit and receive sessions begin and end at the appropriate times. In the example, two peer nodes 305a and 305b time-multiplex transmit and receive data to and from one another. Particularly, as time 325 progresses, the peers may engage in reciprocal transmission/reception intervals. For example, when node 305a begins transmitting 315a, 315c at respective times 310a and 310c, node 305b is in a receiving state 320a, 320c. Conversely, when node 305b begins transmitting 320b, 320d at respective times 310b and 310d, node 305a is in a state for receiving 315b, 315d data.

Figure 4:
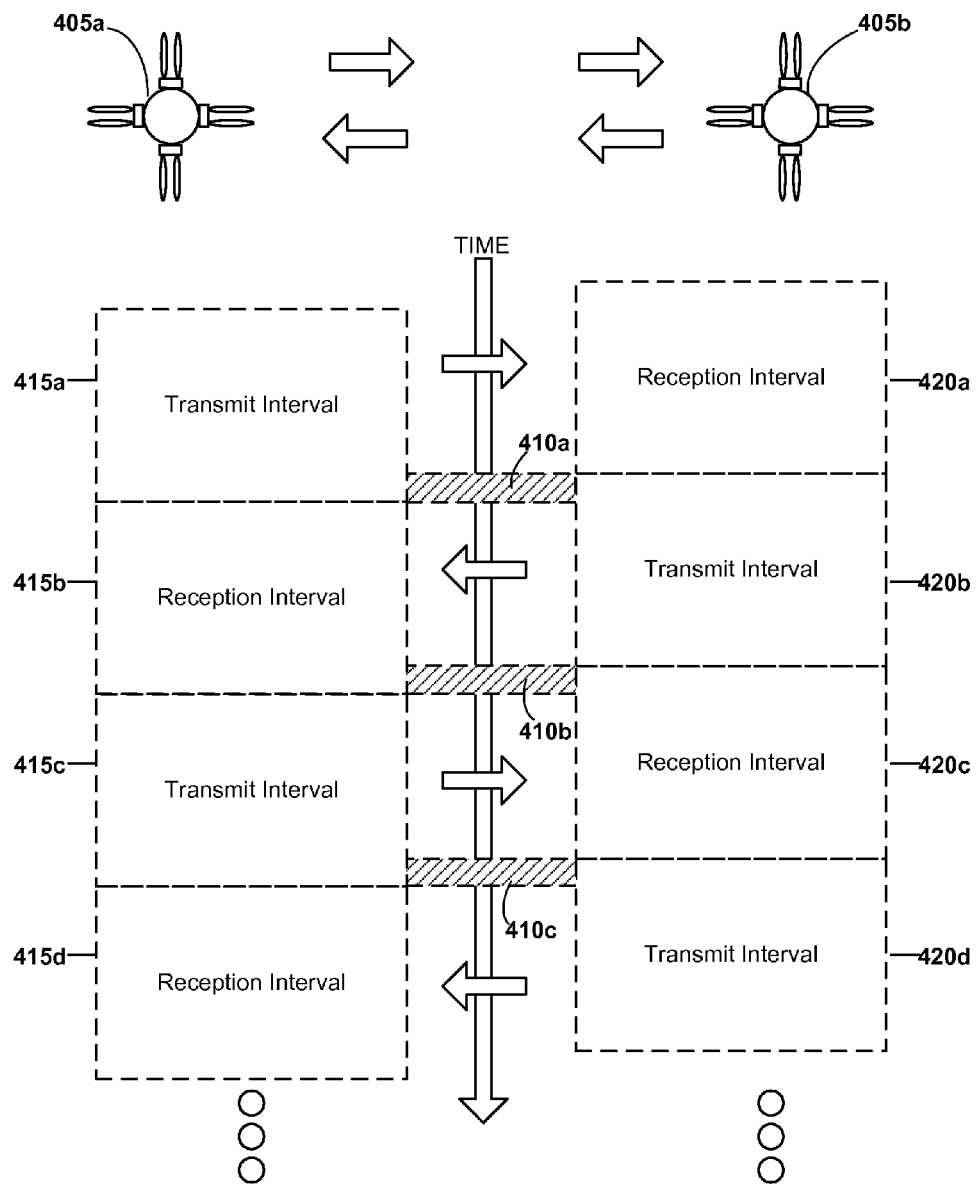
FIG. 4 is a block diagram of a transmission/reception timetable reflecting clock drift as may occur in some embodiments.

FIG. 4 is a block diagram of a transmission/reception timetable reflecting clock drift as may occur in some embodiments. Cumulative clock drift, e.g., as a result of manufacturing variations, defects, clock crystal age, etc., may cause a node's transmission/reception windows to become variable and/or offset. For example, a slow running or delayed clock at node 405a may result in an transmission period 415a overextended by an amount of time 410a. Similar over and underextended periods 410b, 410c may occur, possibly with a cumulative error resulting from past discrepancies. Accordingly, if the misalignment is not corrected, the viable transmission and reception intervals will continue to degrade, mitigating throughput and requiring data to be resent. Where such errors occur at multiple nodes in a network, the cumulative error can be substantial.

Timing Synchronization—Geolocation Reference

Figure 5:
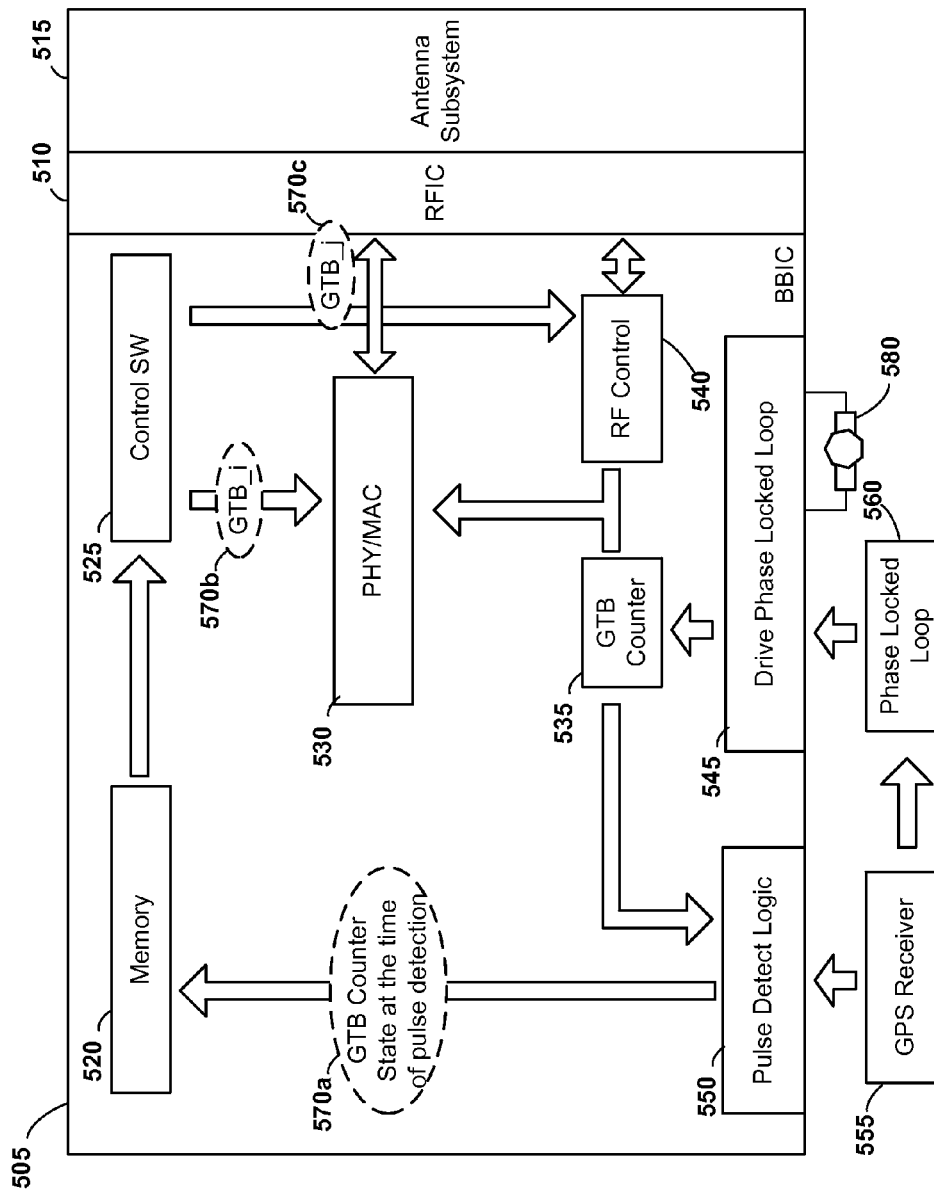
FIG. 5 is a block diagram of some components in a node which may be used for clock correction in some embodiments.

FIG. 5 is a block diagram of some components in a node which may be used for clock correction in some embodiments. A clock crystal 580 (or other clock system, such as a software or hardware counter) referenced by the node 505 may gradually degrade with time or may, e.g., vary from other clocks as a consequence of a manufacturing defect. To compensate for the clock error, the node 505 may rely upon data from a GPS receiver 555 as a common reference with other nodes. Though depicted here separately from the node 505, in some embodiments a GPS receiver 555 and phase locked loop (PLL) 560 may be integrated with the node system. Pulse detect logic 550 may be configured within the node 505 to recognize the receipt of data at the receiver 555. For example, logic 550 may detect the rising (or falling) edge of an external pulse trigger connected to one of the chip ports (e.g., the General Purpose Input/Output port). As all the nodes in the network, or least the neighboring peer nodes, should receive substantially the same signal at substantially the same time, this detection may serve as a common reference.

The Global Timing Block (GTB) counter 535 may be located inside a base-band integrated chip. The GTB may tick continuously in free running fashion with a frequency driven by the drive PLL 545, wrapping around when reaching a maximum value. The system may assure that all transmissions (bursts, PHY frames, etc.) and receptions in the PHY can be triggered at a precise time instant defined, e.g., by software 525 programmable based upon the state of GTB counter 555. One will recognize that software 525 may instead be implemented using firmware or hardware in some embodiments.

This architecture can ensure that the node can identify the state of the GTB counter at the time instant the external pulse is detected. It may further assure that the identified value is available for the software 525 to read at its leisure. The PLL 545 frequency (F) may be selected such that the resolution of the detected external pulse phase is (~1/F). The GPS system may provide a 1 pulse-per-second output to the pulse detect logic 550 and Drive PLL 545 with a 10 MHz GPS ref clock.

The pulse detection logic 550 may be used to identify a GTB counter value 570a to be stored in a memory 520. The GTB counter value 570*a* may be acquired from a GTB counter 535 taken at a time identified by the phase locked loops 560 and 545. That is, the phase locked loops 560 and 545 may convert the GPS receiver data to a form commensurate with operations (e.g., the same frequency of the GTB counter 535) on the node 505.

Subsequently, a peer node may transmit a packet containing its own GPS and GTB timing data to the node 505's antenna subsystem 515, which may then be processed by a Radio Frequency Interface Circuit (RFIC) 510 to recover the peer's GTB data 570*c*. Control software 525 on the node 505 may then recover the node 505's own GTB value 570*b* from memory 520. These values may be considered at the PHY/MAC subsystem 530 to identify a suitable offset correction for the clock 580.

Figure 6:
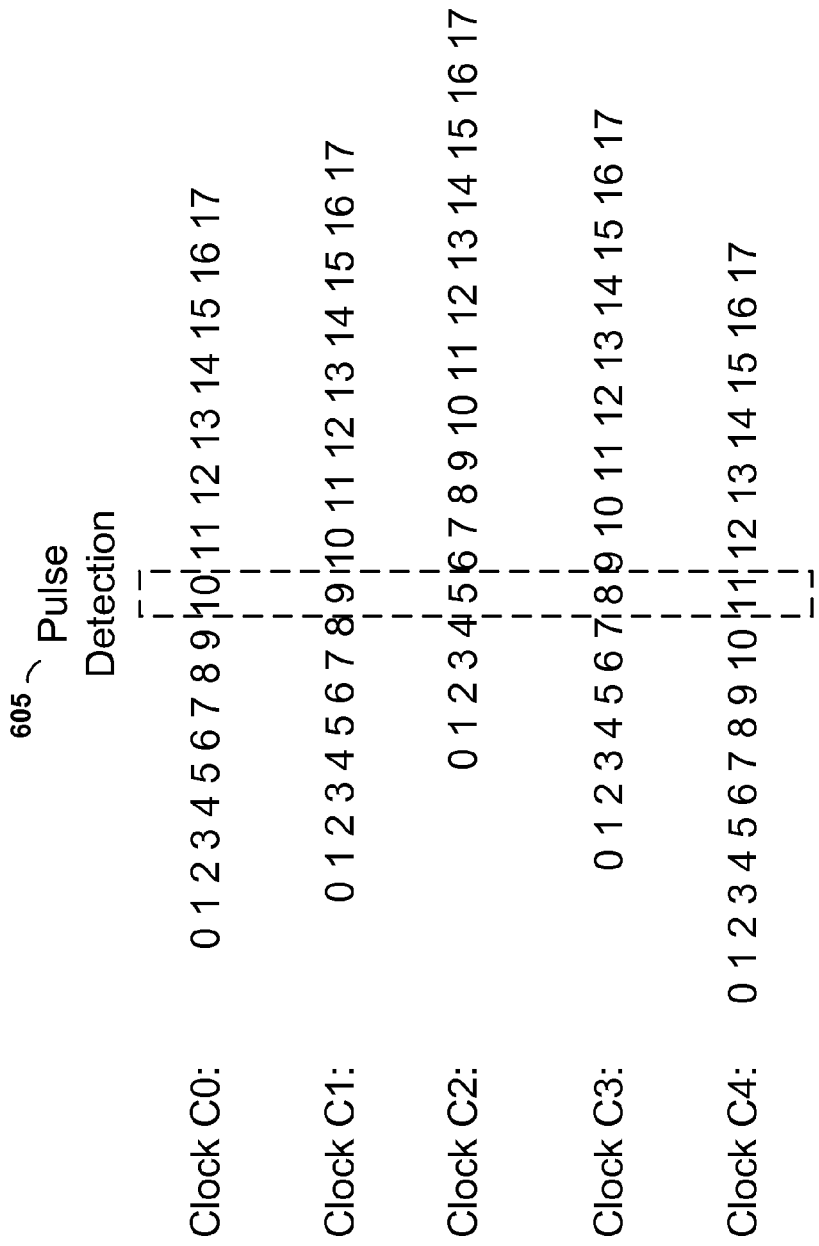
FIG. 6 is a series of idealized node clock values relative to a time of pulse detection as may occur in some embodiments.

FIG. 6 is a series of idealized node clock values relative to a time of pulse detection as may occur in some embodiments. Particularly, consider five nodes having clocks C0, C1, C2, C3 and C4 respectively, where the nodes using clocks C1-C4 are peers of the node using the clock C0. Each of the clocks may be offset relative to one another, as a consequence of a manufacturing defect, start times, cumulative drift, etc. The node 505 may be associated with clock C0. Upon receipt of a packet containing its peer nodes' clock assessments, node 505 may compare its GTB value stored in memory at the time of the GPS pulse detection (605) with its peers' values acquired at the time of the same GPS signal. In this hypothetical example, node 505 will then recognize that clock C0 has an offset of −1 relative to clock C1, −5 relative to clock C2, −2 relative to clock C3, and +1 relative to clock C4. Thus, node 505 may adjust its own local offset to achieve a global alignment with each of the other nodes. For example, the nodes may globally agree to rely upon the earliest (clock C4) of the peers, such that successive corrections result in the entire network being generally harmonized (one will readily recognize that alternative standardization schemes may be applied).

Figure 7:
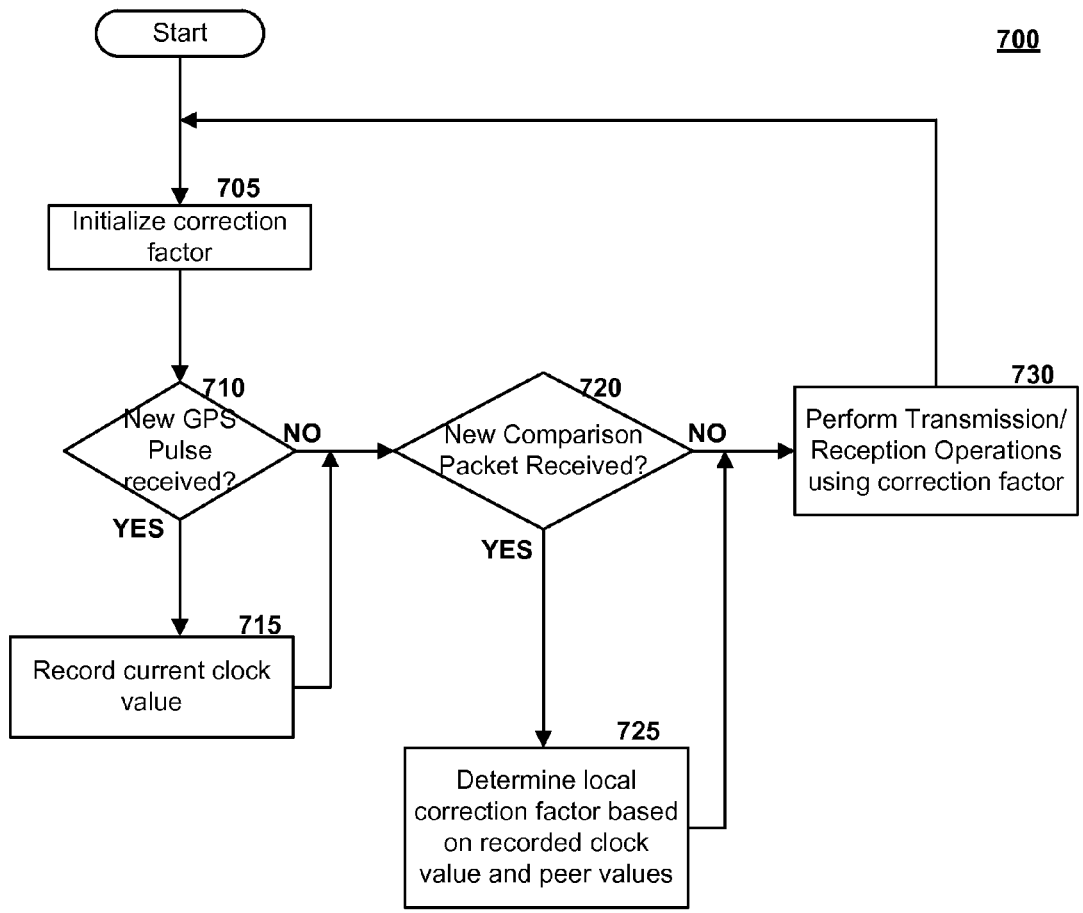
FIG. 7 is a flow diagram illustrating a method for clock synchronization using GPS timing values as may be implemented in some embodiments.

FIG. 7 is a flow diagram illustrating a method for clock synchronization using GPS timing values as may be implemented at a node in some embodiments. At block 705 the node may initialize the correction factor for its clock (e.g. based on past correction values or establishing a default of no correction). When a new GPS pulse is received at block 710 the node may record the current clock value at block 715. At block 720 the system may determine if a new comparison packet has been received from one or more of its peers. The system may then determine the local correction factor to be globally synchronized with the peers at block 725. The node may then perform transmission and reception at block 730 with the correction factor. Though depicted relative to a single peer in FIG. 7 one will recognize that corrections may be asynchronously handled for multiple peers of a node. Similarly, though each correction factor for each antenna set at a node may be different, as a whole, the corrections may serve for all the sets to operate synchronously with the global behavior of the network.

Timing Synchronization—Local GPS Unavailability

Figure 8:
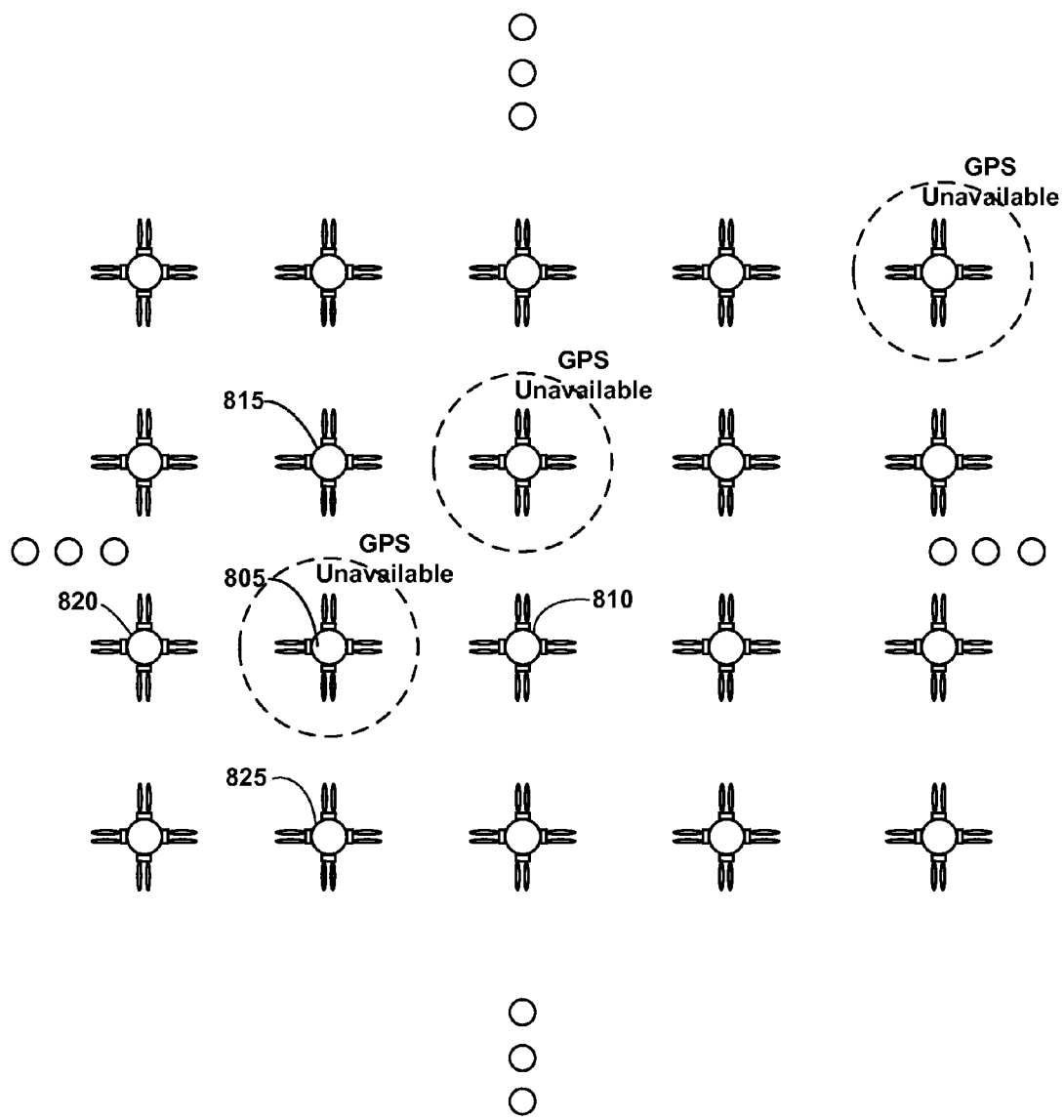
FIG. 8 is a block diagram illustrating a wireless node network topology including nodes lacking GPS functionality as may occur in some embodiments.

Although GPS timestamps may serve as phase (1 pulse per second) and clock (10 MHz) references, there are conditions in which a GPS signal may not be available for 100% of the time, or at all, at a given node. Thus, in some instances, less than all of the nodes in a network may have access to GPS functionality. FIG. 8 is a block diagram illustrating a wireless node network topology including nodes lacking GPS functionality as may occur in some embodiments. Rather than use its own GPS value to make a correction, a node without GPS such as node 805 may need to rely directly, or indirectly, upon the GPS capabilities of a peer nodes 810, 815, 820, and 825 to determine suitable synchronized time offsets.

Figure 9:
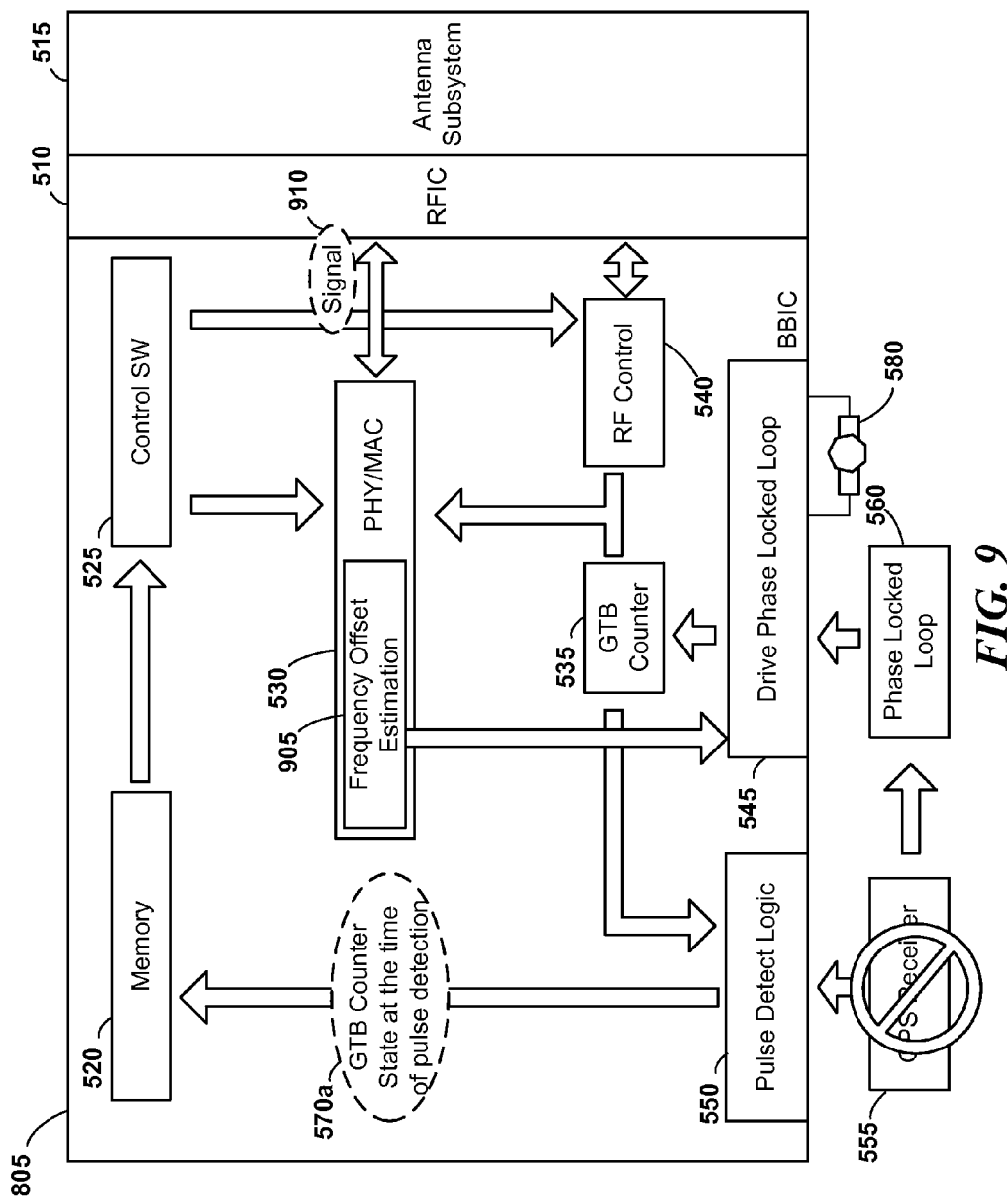
FIG. 9 is a block diagram of some components in a node including a frequency offset estimation module which may be used for clock correction in some embodiments.

FIG. 9 is a block diagram of some components in a node including a frequency offset estimation module which may be used for clock correction in some embodiments. The node may be, e.g., the node 805 lacking GPS capabilities as indicated. The nodes may additionally include a frequency offset estimation system 905 to compensate for GPS unavailability. Generally, the node software/firmware/hardware may detect the absence of 10 MHz GPS ref clock reference (or may, e.g., be hardcoded to recognize that no GPS data will be available). The (D)PLL 545 may then begin relying on the clock crystal 580 which may drift relative to the rest of the node network. A frequency offset estimated using a frequency offset estimation module 905 based on received packets over the air may be used to correct the frequency of the (D)PLL 545. In this manner, nodes which do not have access to a GPS signal may receive a clock reference via one or more surrounding nodes.

Figure 10:
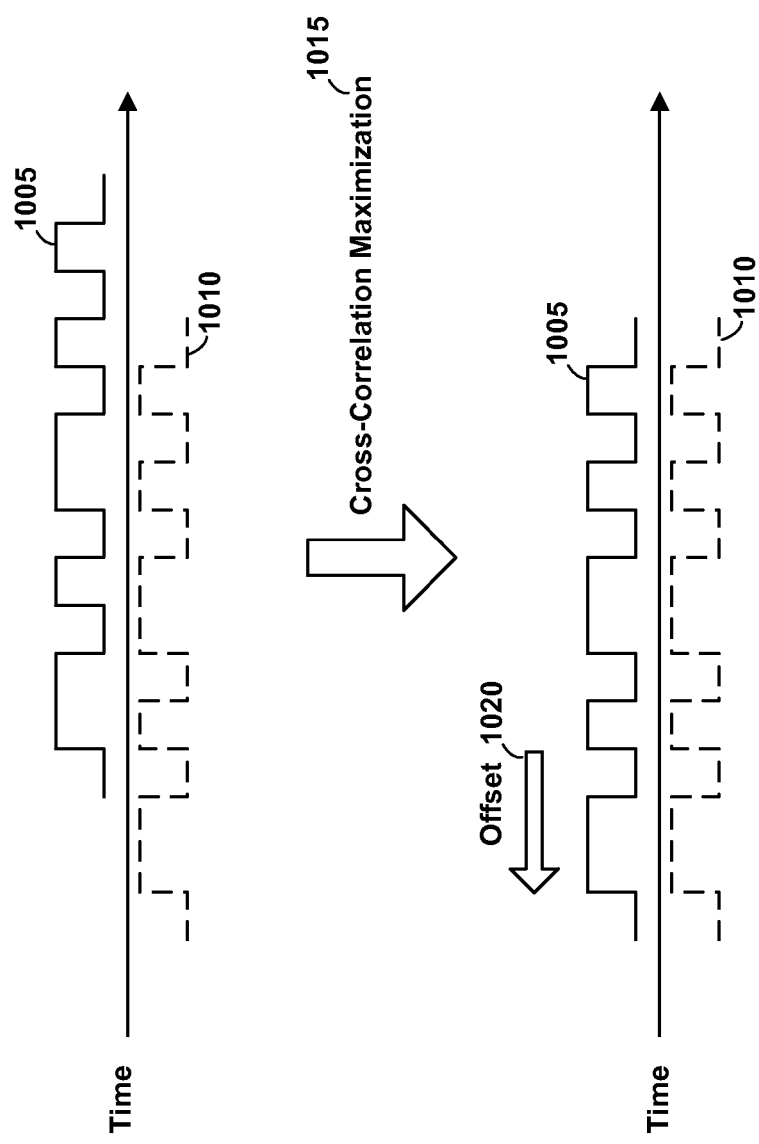
FIG. 10 is a pair of timing diagrams illustrating the use of cross-correlation to correct a local clock based upon a trusted peer as may be implemented in some embodiments.

FIG. 10 is a pair of timing diagrams illustrating the use of cross-correlation to correct a local clock based upon a trusted peer as may be implemented in some embodiments. A node lacking GPS capability may expect, in accordance with its local clock, to receive a signal 1010 at a given time. In reality, however, the signal 1005 may be received from a peer having GPS capability (accounting for the delay of intervening nodes). The offset 1020 between the two signals may be determined by maximizing the cross-correlation 1015 between the signals. The offset 1020 may be used as the clock offset for the local node. Thus, nodes lacking GPS capability may infer the appropriate correction to the global network from GPS-capable nodes.

Figure 11:
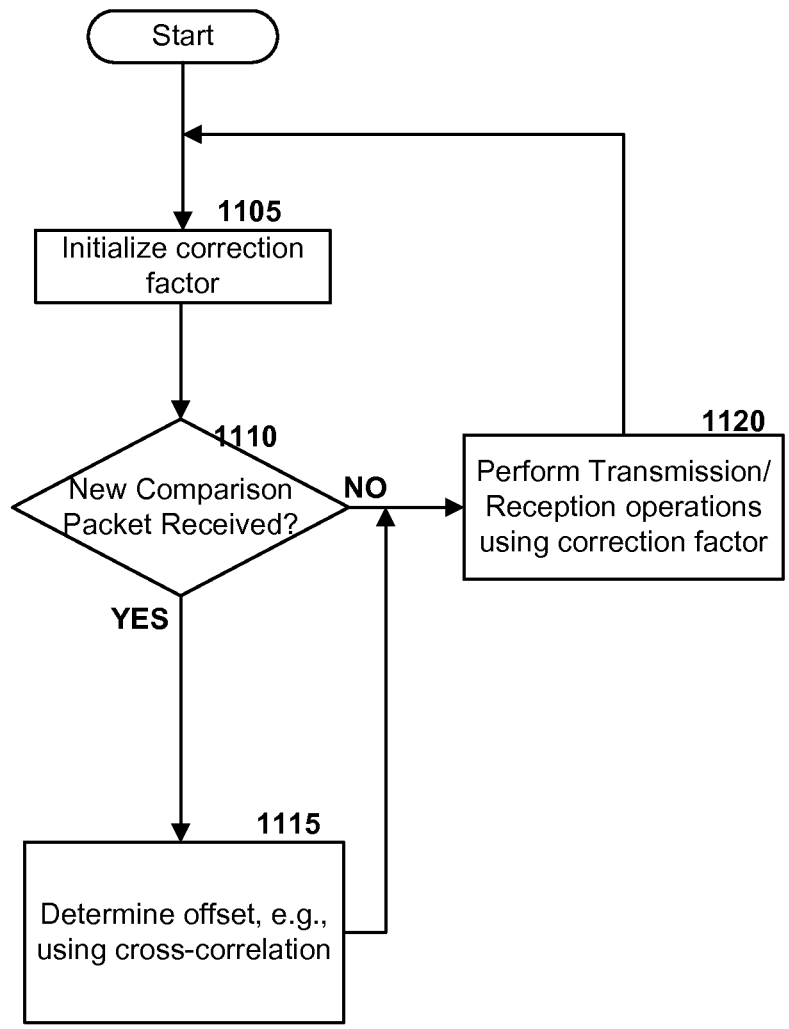
FIG. 11 is a flow diagram illustrating a method for clock synchronization using GPS timing values as may be implemented in some embodiments.

FIG. 11 is a flow diagram illustrating a method for clock synchronization using GPS values as may be implemented in some embodiments. At block 1105, the system may initialize a correction factor for its clock (e.g. based on past correction values or establishing a default of no correction). When a new comparison packet is received at block 1110, the node may determine the offset using, e.g., the cross-correlation at block 1115. At block 1120, the system may perform standard transmission/reception operations using the correction factor.

Figure 12:
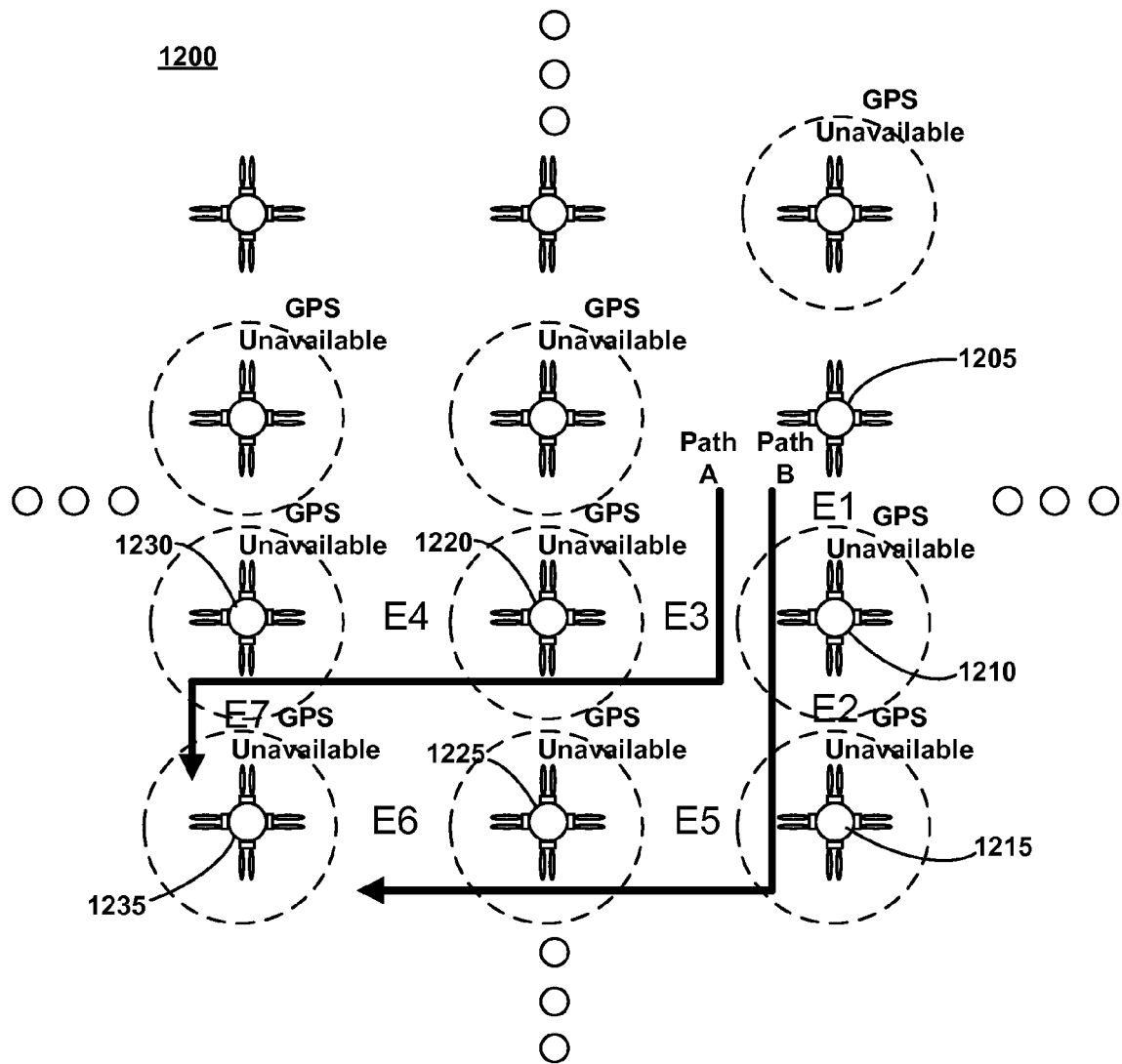
FIG. 12 is a block diagram illustrating a wireless node network topology having error paths considered during clock synchronization as may occur in some embodiments.

Timing Synchronization—Local GPS Unavailability—Path Compensation

Where a node lacking GPS capabilities is very distant from a reference GPS node having GPS capabilities, it may be necessary to account for cumulative errors in the path from the reference node to the requesting node. FIG. 12 is a block diagram illustrating a wireless node network topology 1200 having error paths considered during clock synchronization as may occur in some embodiments.

A node 1235 lacking GPS capability may seek a reference signal from node 1205 having such ability (and consequently synchronized with the remainder of the network). Where the cross-correlation is to be used, the intervening cumulative error generated by intermediate nodes may be considered. Thus, each node may maintain a record of the error/delay experienced with a given one of its peers. For example, an error E1 may be incurred between nodes 1205 and 1210, an error E3 between nodes 1210 and 1220, an error E6 between nodes 1225 and 1235, etc. Note that the errors may be time varying and may not be the same in both directions.

Thus, e.g., where the signal is received along Path A, the cumulative error will be: E1+E3+E4+E7. Similarly, where the signal is received along Path B, the cumulative error will be: E1+E2+E5+E6.

Timing Synchronization System Component Relations

Figure 13:
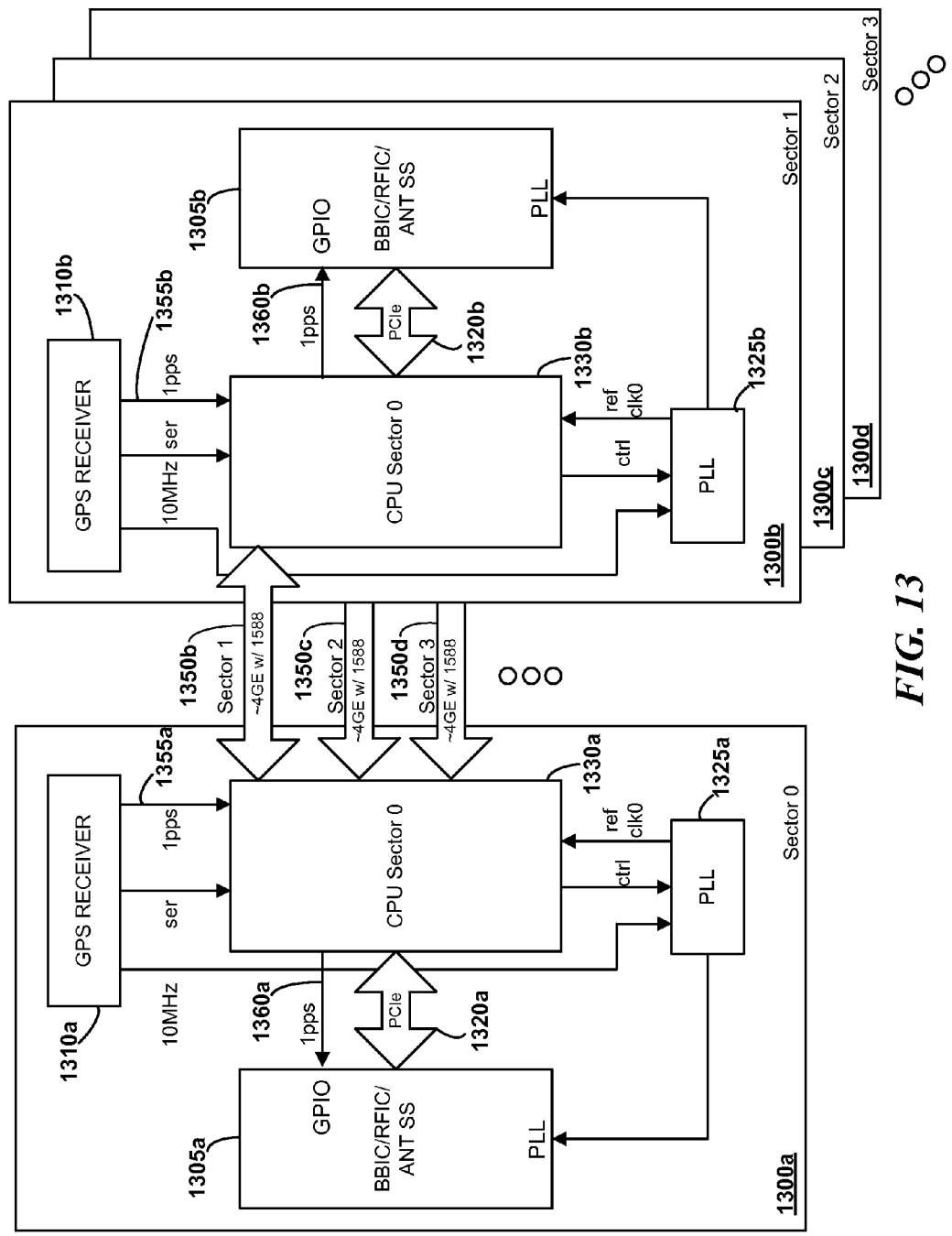
FIG. 13 is a block diagram illustrating a component topology in nodes handling different sectors, some of the nodes lacking GPS capabilities, as may be implemented in some embodiments.

FIG. 13 is a block diagram illustrating a component topology in nodes handling different sectors, some of the nodes lacking GPS capabilities, as may be implemented in some embodiments. One or more nodes associated with sectors 1300a, 1300b, 1300c, 1300d in a given dynamic network may temporarily, or permanently, lose reliable GPS capability. In some instances, a GPS receiver may only be provided to a "primary" sector node's board, and other nodes may be deliberately provided without GPS capabilities, e.g., as a cost saving measure. In situations where GPS capability is inconsistent among nodes, the network may propagate clock references, e.g., the GPS 1588 PTP phase reference 1350b, 1350c, 1350d, across CPUs of different sectors. The system may also propagate the reference between each sector's nodes' CPU 1330a, 1330b and baseband integrated circuit (BBIC) 1305a, 1305b in both directions.

Hardware assisted stamping of the 1588 signal may be used to improve accuracy and precision. A switch CPU 1330a, 1330b may have a counter synchronized to a 1 pulse per second signal 1355a, 1355b from the GPS receiver 1310a, 1310b or a 1588 reference 1350b, 1350c, 1350d coming from another sector. Correction may also, or alternatively, be made from a BBIC 1305a, 1305b communicated through a PCI express connection (PCIe) 1320a, 1320b (e.g., the error may be detected by the BBIC when comparing the pulses per second from the switch relative to over-the-air (OTA) derived timing).

Correction from the BBIC 1305a, 1305b may include a frequency offset which the CPU 1330a, 1330b can program into a PLL 1325a, 1325b. This may be used to ensure that reference clocks are synchronized as well (and to minimize drift). The CPU may have the ability to use the counter to generate a 1 pulse per second signal 1360a, 1360b for the BBIC and to time stamp the 1588 signal. A reference time/phase may arrive from a secondary sector 1300b's node to a primary sector 1300a's node, and may then be distributed from the primary sector 1300a to other secondary sectors (e.g., 1300c and 1300d).

Computer System

Figure 14:
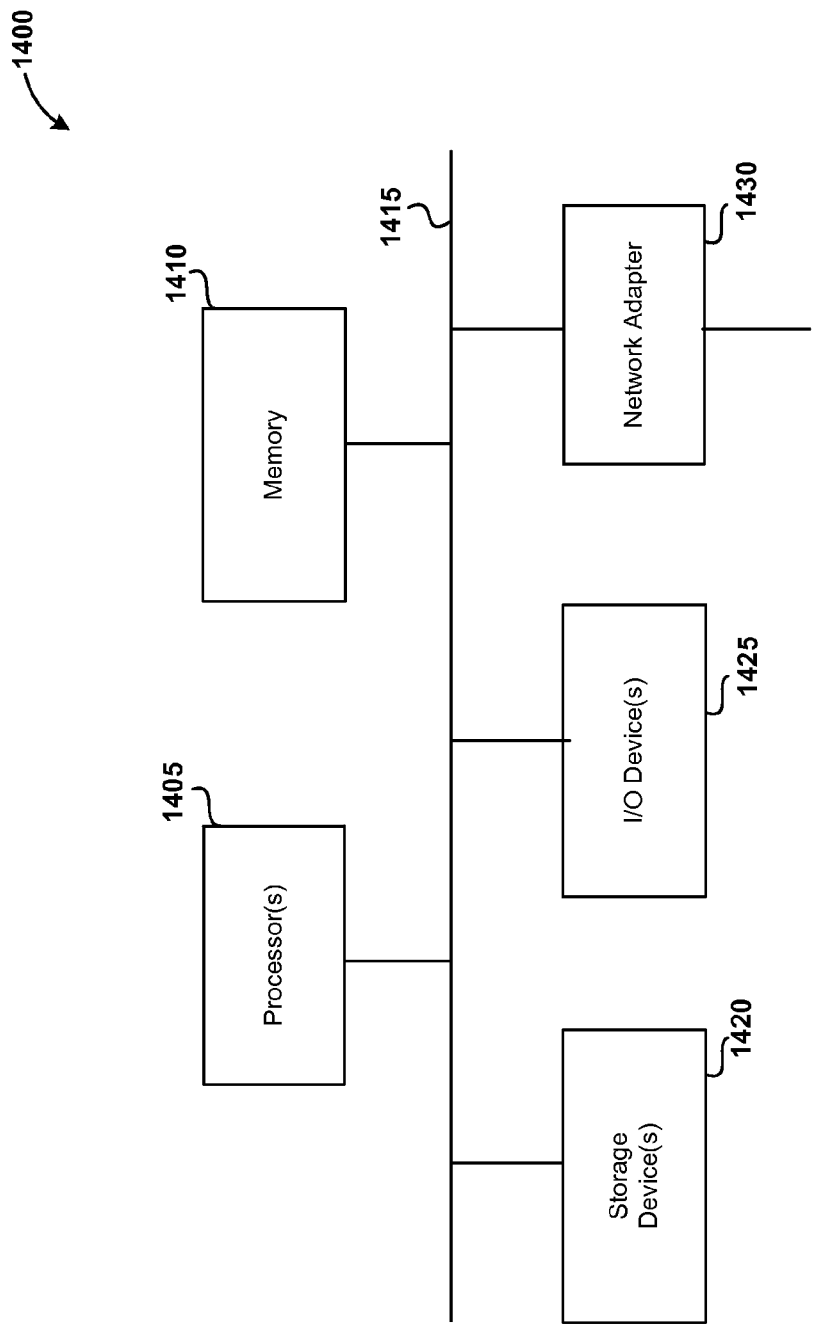
FIG. 14 is a block diagram of a computer system as may be used to implement features of some of the embodiments.

FIG. 14 is a block diagram of a computer system as may be used to implement features of some of the embodiments. The computing system 1400 may include one or more central processing units ("processors") 1405, memory 1410, input/output devices 1425 (e.g., keyboard and pointing devices, display devices), storage devices 1420 (e.g., disk drives), and network adapters 1430 (e.g., network interfaces) that are connected to an interconnect 1415. The interconnect 1415 is illustrated as an abstraction that represents any one or more separate physical buses, point to point connections, or both connected by appropriate bridges, adapters, or controllers. The interconnect 1415, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1410 and storage devices 1420 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 1410 can be implemented as software and/or firmware to program the processor(s) 1405 to carry out actions described above.

In some embodiments, such software or firmware may be initially provided to the processing system 1400 by downloading it from a remote system through the computing system 1400 (e.g., via network adapter 1430).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A communications node comprising:
 a clock; and
 a memory comprising instructions configured to cause the communication node to:
 identify a second communication node in a network having positioning capabilities and synchronized with a portion of the network;
 determine a cumulative error along a path of a plurality of nodes between the communications node and the second communications node;
 receive an external reference signal from the second communications node through the path of the plurality of nodes;
 determine an offset based on the external reference signal, the cumulative error, and an internal reference signal; and
 apply the offset to the clock of the first communication node.

2. The communications node of claim 1, wherein the second communication node is synchronized with one or more nodes having positioning capabilities.

3. The communications node of claim 1, wherein each node along the path of the plurality of nodes lacks GPS functionality.

4. The communications node of claim 1, wherein determining the offset comprises translating the external reference signal until a cross-correlation with an internal reference signal is maximized.

5. The communications node of claim 1, wherein the positioning module is a GPS system.

6. The communications node of claim 1, wherein the second memory comprises a portion of a firmware device.

7. The communications node of claim 1, wherein the instructions are performed in PHY/MAC components of the communications node.

8. The communications node of claim 1, wherein the memory comprising instructions is further configured to cause the communication node to:
 determine a second cumulative error along a second path of a second plurality of nodes between the first communications node and the second communications node; and
 determine the offset based on the external reference signal, the cumulative error, the second cumulative error, and the internal reference signal.

9. A computer-implemented method at a first communications node comprising:
 identifying a second communications node in a network having positioning capabilities and synchronized with a portion of the network;
 determining a cumulative error along a path of a plurality of nodes between the first communications node and the second communications node;
 receiving an external reference signal from the second communications node through the path of the plurality of nodes;
 determining an offset based on the external reference signal, the cumulative error, and an internal reference signal; and
 applying the offset to a clock of the first communication node.

10. The computer-implemented method of claim 9, wherein each node of the plurality of nodes along the path lacks GPS functionality.

11. The computer-implemented method of claim 9, wherein determining the offset comprises translating the signal until a cross-correlation with an internal reference signal is maximized.

12. The computer-implemented method of claim 9, wherein the cumulative error comprises both clock errors at each node of the plurality of nodes along the path and delays caused by obstacles between nodes along the path.

13. The computer-implemented method of claim 9, wherein the method is performed in PHY/MAC components of the first communications node.

14. The computer-implemented method of claim 9, further comprising:
 determining a second cumulative error along a second path of a second plurality of nodes between the first communications node and the second communications node; and
 determining the offset based on the external reference signal, the cumulative error, the second cumulative error, and the internal reference signal.

* * * * *